United States Patent
Paszkowicz et al.

(10) Patent No.: US 10,223,602 B2
(45) Date of Patent: Mar. 5, 2019

(54) DYNAMIC CONTROL APPARATUS AND RELATED METHOD

(71) Applicant: Jaguar Land Rover Limited, Coventry, Warwickshire (GB)

(72) Inventors: Sebastian Paszkowicz, Coventry (GB); Robert Hardy, Coventry (GB); Eduardo Dias, Coventry (GB); George Alexander, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 15 days.

(21) Appl. No.: 15/525,409

(22) PCT Filed: Nov. 2, 2015

(86) PCT No.: PCT/EP2015/075462
§ 371 (c)(1),
(2) Date: May 9, 2017

(87) PCT Pub. No.: WO2016/078901
PCT Pub. Date: May 26, 2016

(65) Prior Publication Data
US 2018/0285665 A1    Oct. 4, 2018

(30) Foreign Application Priority Data

Nov. 19, 2014 (GB) .................................. 1420553.8

(51) Int. Cl.
*G06K 9/00* (2006.01)
*B60W 40/09* (2012.01)
(Continued)

(52) U.S. Cl.
CPC ......... *G06K 9/00845* (2013.01); *B60W 40/08* (2013.01); *B60W 40/09* (2013.01);
(Continued)

(58) Field of Classification Search
CPC .... B60K 9/00845; B60W 40/09; B60W 50/12
(Continued)

(56) References Cited

U.S. PATENT DOCUMENTS

| 8,144,002 B2* | 3/2012 | Kiuchi | G08G 1/166 340/435 |
| 9,043,042 B2* | 5/2015 | Kalhous | G06F 3/013 701/1 |

(Continued)

FOREIGN PATENT DOCUMENTS

| DE | 102011116301 A | 4/2012 |
| EP | 2000889 A2 | 12/2008 |

(Continued)

OTHER PUBLICATIONS

Combined Search and Examination Report, GB Application No. 1420553.8, dated May 19, 2015, 7 pages.
(Continued)

*Primary Examiner* — Tan Q Nguyen
(74) *Attorney, Agent, or Firm* — Myers Bigel, P.A.

(57) ABSTRACT

The present application relates to a method of dynamically controlling one or more systems in a vehicle (V). The method uses at least one image sensor (3-1, 3-2) to determine driver attentiveness. The sensitivity of one or more vehicle driver aid systems are then controlled in dependence on the determined driver attentiveness. The present application also relates to a dynamic control apparatus (1); and to a vehicle (V).

17 Claims, 7 Drawing Sheets

(51) Int. Cl.
  *B60W 50/00* (2006.01)
  *B60W 40/08* (2012.01)
  *B60W 50/12* (2012.01)
  *B60W 50/16* (2012.01)
(52) U.S. Cl.
  CPC ........ *B60W 50/0098* (2013.01); *B60W 50/12* (2013.01); *B60W 50/16* (2013.01); *B60W 2040/0818* (2013.01); *B60W 2050/0075* (2013.01); *B60W 2540/26* (2013.01)
(58) Field of Classification Search
  USPC .......................................................... 701/36
  See application file for complete search history.

(56) References Cited

U.S. PATENT DOCUMENTS

| | | | |
|---|---|---|---|
| 9,248,796 B2* | 2/2016 | Takahashi | B60R 21/00 |
| 9,881,221 B2* | 1/2018 | Bala | G06K 9/00845 |
| 2006/0011399 A1* | 1/2006 | Brockway | A61B 5/18 |
| | | | 180/272 |
| 2006/0149426 A1* | 7/2006 | Unkrich | B60R 25/255 |
| | | | 701/1 |
| 2009/0097705 A1* | 4/2009 | Thorn | G06Q 10/02 |
| | | | 382/103 |
| 2012/0212353 A1 | 8/2012 | Fung et al. | |
| 2014/0244105 A1 | 8/2014 | Dariush et al. | |

FOREIGN PATENT DOCUMENTS

| | | |
|---|---|---|
| EP | 2752348 A1 | 7/2014 |
| GB | 2500690 A | 10/2013 |
| JP | 2007253820 A | 10/2007 |
| JP | 2008174092 A | 7/2008 |

OTHER PUBLICATIONS

Notification of Transmittal of the International Search Report and the Written Opinion of the International Searching Authority, or the Declaration, PCT/EP2015/075462, dated Jan. 22, 2016.

* cited by examiner

DYNAMIC CONTROL APPARATUS AND RELATED METHOD

RELATED APPLICATIONS

This application is a 35 U.S.C. § 371 national stage application of PCT Application No. PCT/EP2015/075462, filed on Nov. 2, 2015, which claims priority from Great Britain Patent Application No. 1420553.8 filed on Nov. 19, 2014, the contents of which are incorporated herein by the English language as International Publication No. WO 2016/078901 A1 on May 26, 2016.

TECHNICAL FIELD

The present disclosure relates to a dynamic control apparatus and related method. In particular, but not exclusively, embodiments of the invention relate to an apparatus and method for dynamically controlling one or more vehicle driver aid systems. Aspects of the invention relate to an apparatus, to a method and to a vehicle.

BACKGROUND

It is known from US 2002/0140562 to provide a system for monitoring a driver's attention to driving a vehicle. The system includes a camera having a field of view in which the driver's face is positioned. A gaze and facial pose determiner is provided to determine whether the gaze and facial pose of the driver is oriented in a forwards direction of travel of the vehicle. An object distance determiner determines a relative distance from the vehicle to an object viewed by an object monitoring camera. An alarm can notify the driver that the gaze and facial pose are not oriented in the forward direction of travel of the vehicle.

At least in certain aspects, the present invention seeks to provide improved control of the vehicle driver aid systems.

SUMMARY OF THE INVENTION

Aspects of the present invention relate to a method of dynamically controlling one or more vehicle driver aid systems; to a dynamic control apparatus for controlling one or more vehicle driver aid systems; and to a vehicle.

According to a further aspect of the present invention there is provided a method of dynamically controlling one or more vehicle driver aid systems, the method comprising:

using at least one image sensor to determine driver attentiveness; and controlling the sensitivity of one or more of said vehicle driver aid systems in dependence on the determined driver attentiveness. Thus, the method can provide dynamic control of one or more vehicle driver aid systems based on the behaviour of the driver. By way of example, if the driver is looking away from the road for a predefined time, the sensitivity of said one or more vehicle driver aid systems can be increased. By monitoring the line of sight of the driver, the sensitivity of said one or more vehicle driver aid systems can be altered dynamically.

The method comprises adjusting the sensitivity of said one or more vehicle driver aid systems. A controller can be used to adjust the sensitivity of said one or more vehicle driver aid systems. The sensitivity setting of the vehicle driver aid system can be inversely proportional to the determined attentiveness level of the driver. The sensitivity level can be increased when a decrease in driver attentiveness is identified. Conversely, the sensitivity level can be reduced when an increase in driver attentiveness is identified.

A processor can be used to determine driver attentiveness. The processor can be coupled to said at least one image sensor. The processor can receive image data from said at least one image sensor for processing. Determining the driver attentiveness can comprise monitoring an eyes off-road event and/or an eyes on-road event. The eyes off-road event represents a scenario where the driver is not looking at the road. In certain embodiments, the eyes off-road event can more precisely represent a scenario where the driver is not looking at the road in front of the vehicle (i.e. the driver is not looking in a forwards direction). Conversely, the eyes on-road event represents a scenario where the driver is looking at the road.

The determined driver attentiveness can comprise measuring a cumulative time and/or frequency of said eyes off-road event and/or said eyes on-road event. Thus, the amount of time during which the driver is looking at (or not looking at) the road can be quantified. The determined driver attentiveness could be determined based on a ratio of a first time for eyes off-road event(s) (i.e. when the driver is not looking at the road) to a second time for eyes on-road event(s) (i.e. when the driver is looking at the road).

The method can comprise determining that driver attentiveness has increased when an eyes on-road event is detected for a first predefined time period; and determining that driver attentiveness has decreased when an eyes off-road event is detected for a second predefined time period. The first and second predefined time periods can be the same, for example 2 seconds. Alternatively, the first and second predefined time periods can be different. The first predefined time period can be greater than the second predefined time period, or vice versa.

The method can comprise categorizing driver attentiveness. The driver attentiveness can be categorised based on one or more predefined attentiveness levels. The categorisation can be based on one or more predefined time thresholds. The thresholds can each define a cumulative duration of an eyes off-road event.

The driver attentiveness can be determined by monitoring driver head pose and/or driver gaze direction. Alternatively, the driver attentiveness can be determined by plotting a virtual projection corresponding to a line of sight of the driver. The virtual projection can be based on both head pose and driver gaze direction. The virtual projection can take the form of a gaze vector representative of a principal axis of the line of sight of the driver.

The eyes on-road event and/or eyes off-road event can be determined with reference to a virtual model of a portion of the vehicle. The virtual model can comprise a three-dimensional representation of at least a portion of an interior of the vehicle cabin. The virtual model can define one or more areas of interest. For example, one said area of interest can correspond to a window in the vehicle, such as the front windscreen. The virtual projection can be integrated into the virtual model to determine if the virtual projection intersects a predefined area of interest.

The virtual model can comprises a plurality of predefined areas of interest. The method can comprise comparing the line of sight of the driver to said plurality of predefined areas of interest. A weighting can be applied to each of said predefined areas of interest. The driver attentiveness can be determined in dependence on the weighting of the area of interest with which the line of sight of the driver is coincident. The relative weighting of the areas of interest can be defined depending on the direction of travel of the vehicle.

The vehicle driver aid systems can, for example, comprise Advanced Driver Aid Systems including one or more of the following: Adaptive Cruise Control (ACC); Forward Warning Collision (FWC); Lane Departure Warning (LDW); Traffic Jam Assist (TJA); and Lane Keeping Aid (LKA). It will be appreciated that the vehicle driver aid systems can comprise other types of Advanced Driver Aid Systems.

The control of said one or more vehicle driver aid systems can comprise disabling said one or more vehicle driver aid systems for a drive cycle only. Alternatively, or in addition, the control of said one or more vehicle driver aid systems can comprise disabling said one or more vehicle driver aid systems until a threshold is crossed.

The methods described herein are intended to be performed by apparatus comprising one or more processors coupled to at least one image sensor.

A further aspect of the present invention relates to a set of computational instructions which, when running on a processor, cause the processor to perform some or all of the methods described herein. The computational instructions can be encoded on a computer-readable media or in a signal transmitted over a wired or wireless network.

According to a further aspect of the present invention there is provided a dynamic control apparatus for controlling one or more vehicle driver aid systems, the apparatus comprising:

at least one image sensor for monitoring a driver of a vehicle;

one or more processors configured to analyse image data output from said at least one image sensor to determine driver attentiveness; and a controller configured to control the sensitivity of one or more of said vehicle driver aid systems in dependence on said determined driver attentiveness.

The controller can be configured to control the sensitivity setting of the vehicle driver aid system inversely proportional to the determined attentiveness level of the driver. The sensitivity level can be increased when a decrease in driver attentiveness is determined. Conversely, the sensitivity level can be reduced when an increase in driver attentiveness is determined.

The processor can be configured to determine driver attentiveness by identifying an eyes off-road event and/or an eyes on-road event. The processor can be configured to determine driver attentiveness by measuring a cumulative time period of said eyes off-road event and/or said eyes on-road event.

The processor can be configured to determine that driver attentiveness has increased when an eyes on-road event is detected for a first predefined time period; and to determine that driver attentiveness has decreased when an eyes off-road event is detected for a second predefined time period. The first and second predefined time periods can be the same, for example 2 seconds. Alternatively, the first and second predefined time periods can be different. The first predefined time period can be greater than the second predefined time period, or vice versa.

The processor can be configured to categorise driver attentiveness, for example to define one or more attentiveness levels. The categorisation can be based on one or more predefined thresholds.

The processor can be configured to generate a virtual projection corresponding to a line of sight of the driver. The processor can be configured to determine driver attentiveness by comparing the determined virtual projection with a model of at least a portion of said vehicle cabin. The model can be stored in memory. The memory can form part of said dynamic control apparatus.

The virtual model can comprises a plurality of predefined areas of interest. The processor can compare the line of sight of the driver to said plurality of predefined areas of interest. A weighting can be applied to each of said predefined areas of interest. The driver attentiveness can be determined in dependence on the weighting of the area of interest with which the line of sight of the driver is coincident. The relative weighting of the areas of interest can be defined depending on the direction of travel of the vehicle. For example, if the vehicle is moving forwards, the area of interest corresponding to the front windscreen can have the highest weighting. At least in certain embodiments, the weighting of the other areas of interest can be defined in descending order as follows: the controls for the vehicle driver aids (which can be mounted on the steering wheel), an instrument cluster, a touch screen (if the displayed content is driving related), side (door) windows. The touch screen (if the displayed content is not driving related) and the other areas of interest can be defined as having the lowest weighting. Conversely, if the vehicle is moving backwards, the area of interest corresponding to the rear windscreen can have the highest weighting.

The vehicle driver aid systems can, for example, comprise Advanced Driver Aid Systems (ADAS) including one or more of the following: Adaptive Cruise Control (ACC); Forward Warning Collision (FWC); Lane Departure Warning (LDW); Traffic Jam Assist (TJA); and Lane Keeping Aid (LKA).

According to a further aspect of the present invention there is provided a vehicle comprising a dynamic control apparatus as described herein.

The term processor is used herein to refer to one or more electronic microprocessors adapted to perform computational instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

A dynamic control apparatus 1 for a vehicle V in accordance with an embodiment of the present invention will now be described with reference to the accompanying Figures. The dynamic control apparatus 1 is configured to control on-board vehicle driver aid systems in dependence on monitoring the attentiveness of the driver. In particular, the dynamic control apparatus 1 is configured to control the sensitivity level and/or activation of one or more vehicle driver aid systems, such as Advanced Driver Aid Systems (ADAS).

Figure 1:
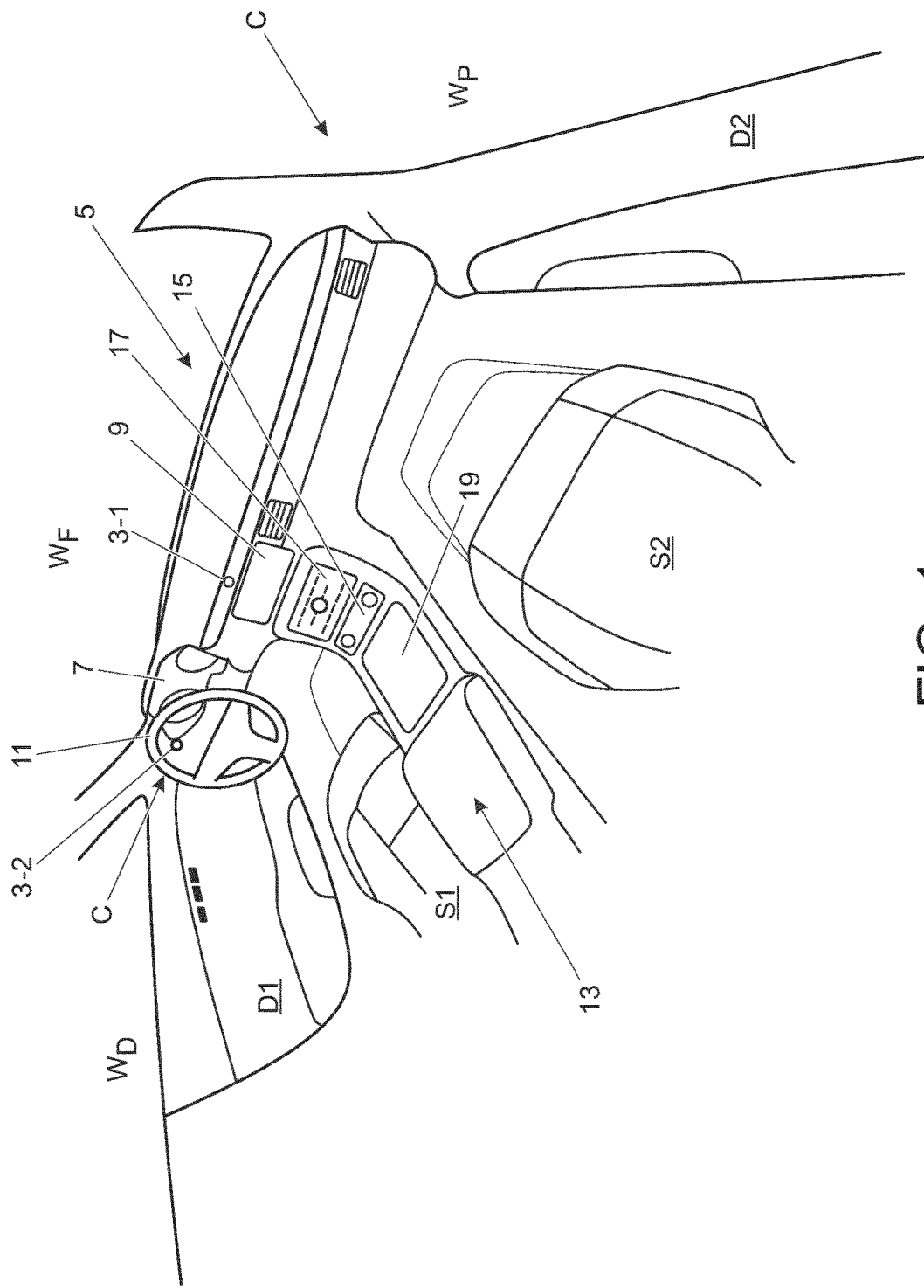
FIG. 1 is a perspective view of a front portion of a vehicle cabin incorporating a dynamic control apparatus according to an embodiment of the present invention.

A perspective interior view of a front portion of a vehicle cabin C having first and second image sensors 3-1, 3-2 is shown in FIG. 1. The cabin C accommodates the vehicle drivers, typically a driver and one or more passengers, and includes various user interfaces for operating vehicle systems. The front portion of the cabin C is defined by the interior of the vehicle V that is housed between a roof portion, a front windscreen $W_F$, a rear windscreen $W_R$, driver and passenger side doors D1, D2, and a vehicle floor (not shown). The cabin C comprises a driver seat S1 for seating the driver and a passenger seat S2 for seating the passenger. The driver seat S1 is accordingly located on a driver side and the passenger seat S2 is located opposite on a passenger side. A driver side window $W_D$ is provided in the driver side door D1; and a passenger side window $W_P$ is provided in the passenger side door D2. It will be appreciated that the invention can be applied in left- and right-hand drive vehicles by changing the location of the image sensors 3-1, 3-2.

A dashboard 5 is located below the front windscreen $W_F$ and extends between the driver and passenger side doors D1, D2. The dashboard 5 comprises a display panel 7 (in the form of an instrument cluster comprising a tachometer, speedometer, and fuel gauge) and an infotainment system control panel 9, which comprises a display screen associated with an infotainment system. The display screen can, for example, comprise a touch-screen. A steering wheel 11 is provided on the driver side of the dashboard 9 to steer the vehicle V. The steering wheel 11 is provided with auxiliary controls (not shown), which allows control of the infotainment system and also can enable selective operational control of the vehicle V, such as activating/deactivating a cruise control function. The driver side and the passenger side of the cabin C are partially separated by a central console 13. The central console 13 comprises a gear selector 15 for operating transmission changes of the vehicle V; and controls 17 for the infotainment system. The central console 13 also comprises a storage compartment 19.

Figure 2:
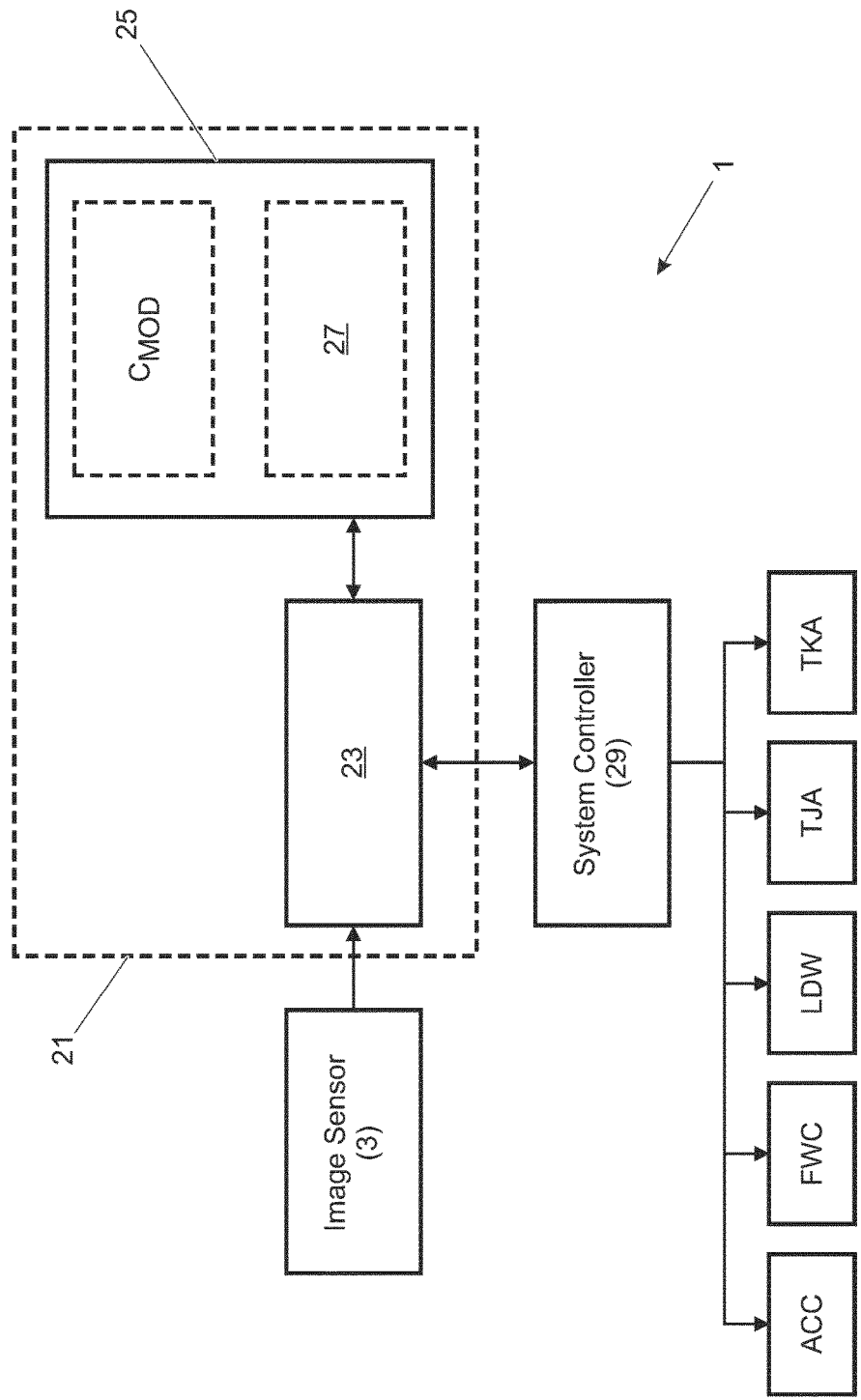
FIG. 2 is a schematic block diagram of a dynamic control apparatus according to an embodiment of the present invention.

FIG. 2 is a schematic block diagram of the dynamic control apparatus 1. The dynamic control apparatus 1 comprises a driver monitor 21 having one or more processors 23 (only one is shown for simplicity of explanation); and one or more memories 25 (only one memory module is shown for simplicity) having computer code 27 stored thereon. The dynamic control apparatus 1 also comprises the first and second image sensors 3-1, 3-2 which are coupled to the driver monitoring module. A vehicle system controller 29 is coupled to the driver monitor 21. The vehicle system controller 29 is adapted to control the operation of one or more ADAS systems in dependence on an output signal from the driver monitor 21, as described in more detail below. The vehicle system controller 29 can comprise one or more processors for performing computational functions. In alternate embodiments, the driver monitor 21 and the vehicle system controller 29 could be combined.

The one or more memories 25 store a three-dimensional model $C_{MOD}$ of the vehicle cabin C. The three-dimensional model $C_{MOD}$ defines the key features of the inside of the cabin C. At least in certain embodiments, the three-dimensional model $C_{MOD}$ can be derived from a Computer-Aided Design (CAD) model of the vehicle V. In this manner, portions of the interior cabin C can be mapped onto a virtual vehicle cabin defined by the three-dimensional model $C_{MOD}$. The interior virtual vehicle cabin comprises a plurality of predefined areas of interest $A_n$ (where n is a whole number). As described herein, the predefined areas of interest $A_n$ correspond to the windows W of the cabin C in the present application.

The first and second image sensors 3-1, 3-2 each comprise a driver-facing camera and at least one image sensor 3 comprises infra-red (or near infra-red) capability for eye-tracking purposes. In a variant, the image sensors 3-1, 3-2 could detect light at a visible wavelength to determine head position and/or eye gaze. However, the use of image sensors 3-1, 3-2 to detect light in the visible spectrum may require cabin lighting to provide illumination in low light conditions.

Figure 3:
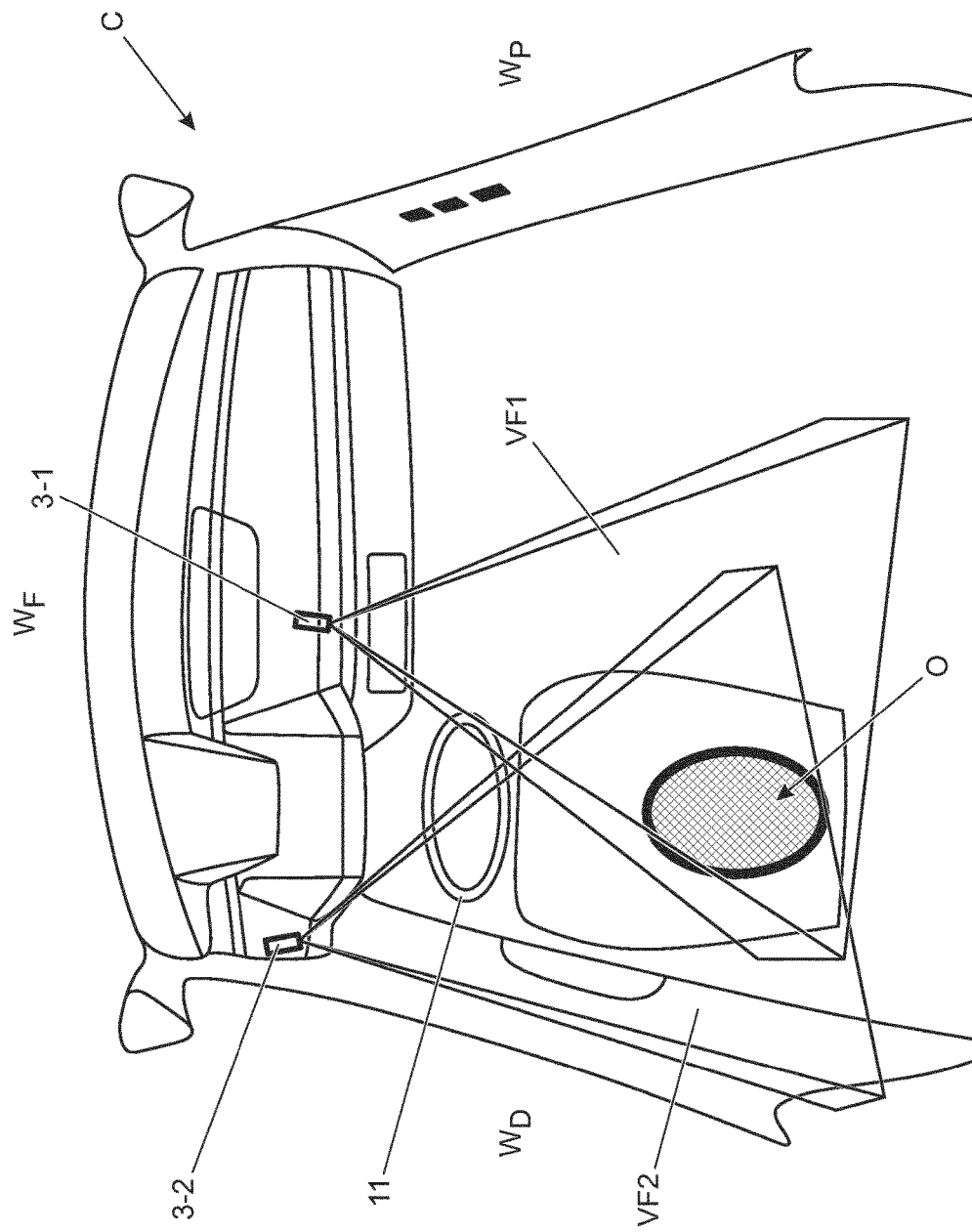
FIG. 3 is a schematic diagram illustrating the arrangement of a pair of image sensors for monitoring a driver in accordance with an embodiment of the present invention.

As shown in FIG. 3, the first image sensor 3-1 is located in the dashboard 9 below a centre-point of the front windscreen $W_F$, and the second image sensor 3-2 is located near a bottom corner of the front windscreen $W_F$ on the driver side of the vehicle V. The first and second image sensors 3-1, 3-2 are oriented inwardly into the cabin C. The field of view matrix of each of the first and second image sensors 3-1, 3-2 is illustrated in FIG. 3 by respective view frustums VF1, VF2. The driver of the vehicle O is shown schematically in FIG. 3. In operation, the first and second image sensors 3-1, 3-2 each generate image data which is output to an image processor. The image sensors 3-1, 3-2 are configured to detect the driver O and can determine a point of origin in three-dimensional coordinate space based on the position of the driver's head. The orientation of the driver's head can also be determined more accurately to model the gaze direction and/or to determine an approximate eye position for use by an eye-tracking mechanism. The position and orientation of the driver's head can be referred to collectively as the "head pose". The eye-tracking mechanism tracks the driver's eyes so as to determine an angular direction of the driver's target line of sight with respect to a fixed reference (known as "gaze direction").

The head orientation and the gaze direction are calculated with respect to the stored three-dimensional model $C_{MOD}$ of the cabin C, as described in more detail with reference to FIGS. 4 and 5. The three-dimensional model $C_{MOD}$ comprises one or more predefined areas of interest $A_n$ (where n is a whole number). The areas of interest $A_n$ in the present application relate primarily (but not exclusively) to the vehicle windows W and the reference numerals indicate the corresponding window W. Thus, the three-dimensional model $C_{MOD}$ comprises the following areas of interest $A_n$: front windscreen $A_{WF}$; rear windscreen; driver side window $A_{WD}$; and passenger side $A_{WP}$. The areas of interest $A_n$ are defined as elements arranged in three-dimensions within the three-dimensional model $C_{MOD}$.

Using the determined point of origin and gaze direction, a virtual projection (which can be referred to as a "gaze vector") is then determined so as to represent the driver's line of sight with respect to the cabin C. The virtual projection is integrated with the three-dimensional model $C_{MOD}$ of the cabin C to determine where the driver is looking. The driver monitor 21 is configured to analyse the resulting data to determine the attentiveness of the driver of the vehicle V. The driver monitor 21 can categorise the driver as being in one of a plurality of predefined levels of attentiveness, namely: Level 1—Attentive; Level 2—Moderately Inattentive; and Level 3—Highly Inattentive. In the present embodiment, the attentive/inattentive states are defined as looking/not looking into the forward road scene. The inattentive states are subdivided (Level 2 and Level 3) based on the amount of time that the driver is not paying attention to the road (i.e. the cumulative time that an eyes off-road event is detected).

To determine the attentiveness level of the driver, the driver monitor 21 is configured to monitor where the driver is looking while they are driving the vehicle V. The driver monitor 21 can, for example, monitor when the virtual projection intersects one of the areas of interest $A_n$ corresponding to a window W. When the virtual projection does not intersect an area of interest $A_n$ corresponding to a window W, the driver monitor 21 determines that the driver is not looking at the road (classed as an 'eyes off-road' event). Conversely, when the virtual projection intersects an area of interest $A_n$ corresponding to a window W, the driver monitor 21 determines that the driver is looking at the road (classed as an 'eyes on-road' event). The attentiveness level of the driver can be determined based on a cumulative time period when the virtual projection does not intersect one of the areas of interest $A_n$ corresponding to a window W. The driver monitor 21 can also be configured to identify when the driver's eyes are closed and modify the attentiveness level accordingly.

Furthermore, the driver monitor 21 could apply a bias or weighting to the areas of interest $A_n$ representing a relative weighting for each window W. For example, the area of interest $A_{WF}$ corresponding to the front windscreen $W_F$ could have a larger weighting than the rear windscreen $W_R$. The weighting could be modified in dependence on the current dynamic operating parameters of the vehicle, for example the direction of travel of the vehicle V and/or the steering angle of the vehicle V. The weighting can be adjusted in dependence on the direction of travel of the vehicle V. When the vehicle V is moving forwards the area of interest $A_{WF}$ corresponding to the front windscreen $W_F$ can have the highest weighting, the controls for the ADAS can have a lower weighting and the other areas of interest $A_n$ can have a still lower weighting (or no weighting). Conversely, while reverse gear is engaged, the weighting can be reversed such that the rear view mirror $A_{WF}$ has the highest weighting, and a reversing camera display (which may be displayed in the screen associated with the infotainment system) can have a lower weighting. The wear windscreen WR can have a still lower weighting, and the other areas of interest $A_n$ can have a still lower weighting (or no weighting).

When the vehicle V is travelling in a forwards direction, the driver monitor 21 can be configured to categorise the driver as being in a Level 1 state (i.e. Attentive) when the virtual projection intersects the area of interest $A_{WF}$ corresponding to the front windscreen $W_F$. In the same driving scenario, if the driver monitor 21 determine that the virtual projection does not intersect the area of interest $A_{WF}$ corresponding to the front windscreen $W_F$ for a period of time exceeding a predefined time threshold (for example 2, 3, 5 or 10 seconds), the driver monitor 21 can determine that the attentiveness of the driver has dropped and, accordingly, re-categorise the attentiveness level of the driver, for example dropping from Level 1 to Level 2 or Level 3.

The driver monitor 21 may also determine that the attentiveness of the driver has decreased if the virtual projection repeatedly moves away from the area of interest $A_{WF}$ corresponding to the front windscreen $W_F$. For example, if the virtual projection repeatedly moves away from the area of interest $A_{WF}$ (for example, exceeding a predefined threshold value) within a defined time period, the driver monitor 21 can re-categorise the attentiveness level of the driver.

The driver monitor 21 is configured to publish the current level of attentiveness to a communications area network (CAN) bus (or other communication BUS). The vehicle system controller 29 is operative to control the sensitivity of on-board vehicle driver aid systems in dependence on the published attentiveness level. In the present embodiment, the vehicle system controller 29 is configured to control operation of the following vehicle driver aid systems: Adaptive Cruise Control (ACC); Forward Warning Collision (FWC); Lane Departure Warning (LDW); Traffic Jam Assist (TJA); and Lane Keeping Aid (LKA). In use, the sensitivity level (or activation state) of one or more of the vehicle driver aid systems is modified in dependence on changes in the determined attentiveness level of the driver.

In prior art arrangements, the ACC typically accelerates to the user-defined speed if no other vehicle is detected in front of the vehicle V. In the present embodiment of the dynamic control apparatus 1, the dynamic control apparatus 1 can control operation of the ACC based on the determined attentiveness level. If the ACC is already ON and the driver attentiveness is in a low level, for example Level 3 (Highly Inattentive), then the sensitivity of the ACC can be increased (+1). The sensitivity of the TJA can optionally also be increased (+1) in conjunction with the change in sensitivity of the ACC. The auto-resume of the vehicle speed can be performed only if the driver is looking to the forward road scene. Thus, if the driver monitor 21 determines that the attentiveness level of the driver is low, for example Level 3 (Highly Inattentive), the vehicle system controller 29 can modify the control strategy of the ACC to inhibit increases in the vehicle speed. The vehicle system controller 29 can revert to the standard control strategy once the determined attentiveness level increases, for example returns to Level 1 (Attentive) or Level 2 (Moderately Inattentive). Alternatively, or in addition, the vehicle system controller 29 could be configured to modify a distance set by the ACC between the vehicle V and the vehicle in front in dependence on the determined attentiveness level of the driver. The ACC can, for example, utilise a radar system to detect other vehicles in the vicinity of the subject vehicle V (typically in front of the vehicle V).

If the driver monitor 21 determines that that the attentiveness level of the driver is low, for example Level 3 (Highly Inattentive), the vehicle system controller 29 can automatically activate the FWC and/or increase the sensitivity of the FWC. The vehicle system controller 29 can automatically deactivate the FWC (or revert to a lower sensitivity level) once the attentiveness level of the driver increases, for example returns to Level 1 (Attentive) or Level 2 (Moderately Inattentive).

If the driver monitor 21 determines that that the attentiveness level of the driver is low, for example Level 3 (Highly Inattentive), the vehicle system controller 29 can automatically activate the LKA. If the vehicle V deviates from the current lane, the LKA can provide feedback to the driver, for example through the steering wheel. The vehicle system controller 29 can automatically deactivate the LKA once the attentiveness level of the driver increases, for example returns to Level 1 (Attentive) or Level 2 (Moderately Inattentive). The vehicle system controller 29 could also be configured to modify a sensitivity level of the LKA in dependence on the determined attentiveness level of the driver. The vehicle system controller 29 can be configured to turn OFF the LKA when the driver monitor 21 determines that that the driver attentiveness is in a high level, for example Level 1 (Attentive).

If the driver monitor 21 determines that that the attentiveness level of the driver is low, for example Level 3 (Highly Inattentive), the vehicle system controller 29 can automatically activate the TJA. If the TJA is already ON and the driver attentiveness is in a low level, for example Level 3 (Highly Inattentive), then the sensitivity level of the TJA can be increased (+1). The TJA combines the LKA with a Queue Assist Function. The vehicle system controller 29 can automatically deactivate the TJA once the attentiveness level of the driver increases, for example Level 1 (Attentive) or Level 2 (Moderately Inattentive). The vehicle system controller 29 could also be configured to modify a sensitivity level of the TJA in dependence on the determined attentiveness level of the driver.

If the driver monitor 21 determines that that the attentiveness level of the driver is low, for example Level 3 (Highly Inattentive), the vehicle system controller 29 can automatically activate the LDW. Alternatively, or in addition, the vehicle system controller 29 can adjust the sensitivity level of the LDW in dependence on the determined attentiveness level of the driver. For example, the sensitivity level of the LDW can be increased to compensate for a determined drop in the attentiveness level of the driver. The vehicle system controller 29 can automatically deactivate the LDW, or revert to a lower sensitivity level, once the attentiveness level of the driver increases, for example to Level 1 (Attentive) or Level 2 (Moderately Inattentive). The driver monitor 21 can be configured automatically deactivate the LDW if it determines that that the attentiveness level of the driver is Level 1 (Attentive).

Different control strategies implemented by the vehicle system controller 29 are outlined below by way of example only.

| STRATEGY 1 |
| --- |
| IF the dynamic control apparatus is enabled<br>    AND an ADAS feature is active<br>    AND the camera system detects that the driver is<br>        mod.inattentive to the forward road scene<br>    THEN the system shall set the incrementally +1 level of system<br>    sensitivity level for the feature**<br>OR<br>IF the dynamic control apparatus is enabled<br>    AND an ADAS feature is NOT active<br>    AND the system detects that the driver is hi.inattentive to the<br>        forward road scene<br>    THEN A given set of ADAS features shall be enabled<br>    AND max level of system sensitivity shall be set for the feature<br>ELSE<br>No Change |

| STRATEGY 2 |
| --- |
| IF The ACC OR TJA system has reduced the speed of the vehicle.<br>    THEN Only resume to previous set speed when driver is<br>        determined to be in Attentive state<br>ELSE<br>Maintain adjusted speed |

The virtual model $C_{MOD}$ has been described as comprising areas of interest $A_n$ corresponding to the windows W of the vehicle V. It will be appreciated that that virtual model $C_{MOD}$ can define additional areas of interest $A_n$. For example the areas of interest $A_n$ can correspond to one or more of the following: the display panel 7 (forming the instrument cluster); the infotainment system control panel 9; and one or more of said storage compartments 19. The inventors have recognised that the driver is likely to be in a more attentive state when studying the instrument cluster than when they are looking in a storage compartment 19. This can be reflected by defining different weightings for each of the areas of interest $A_n$ forming part of the virtual model $C_{MOD}$.

The operation of the dynamic control apparatus 1 illustrated in FIG. 2 will now be explained in detail with reference to a three-dimensional model $C_{MOD}$ illustrated in FIGS. 4 and 5.

Figure 4:
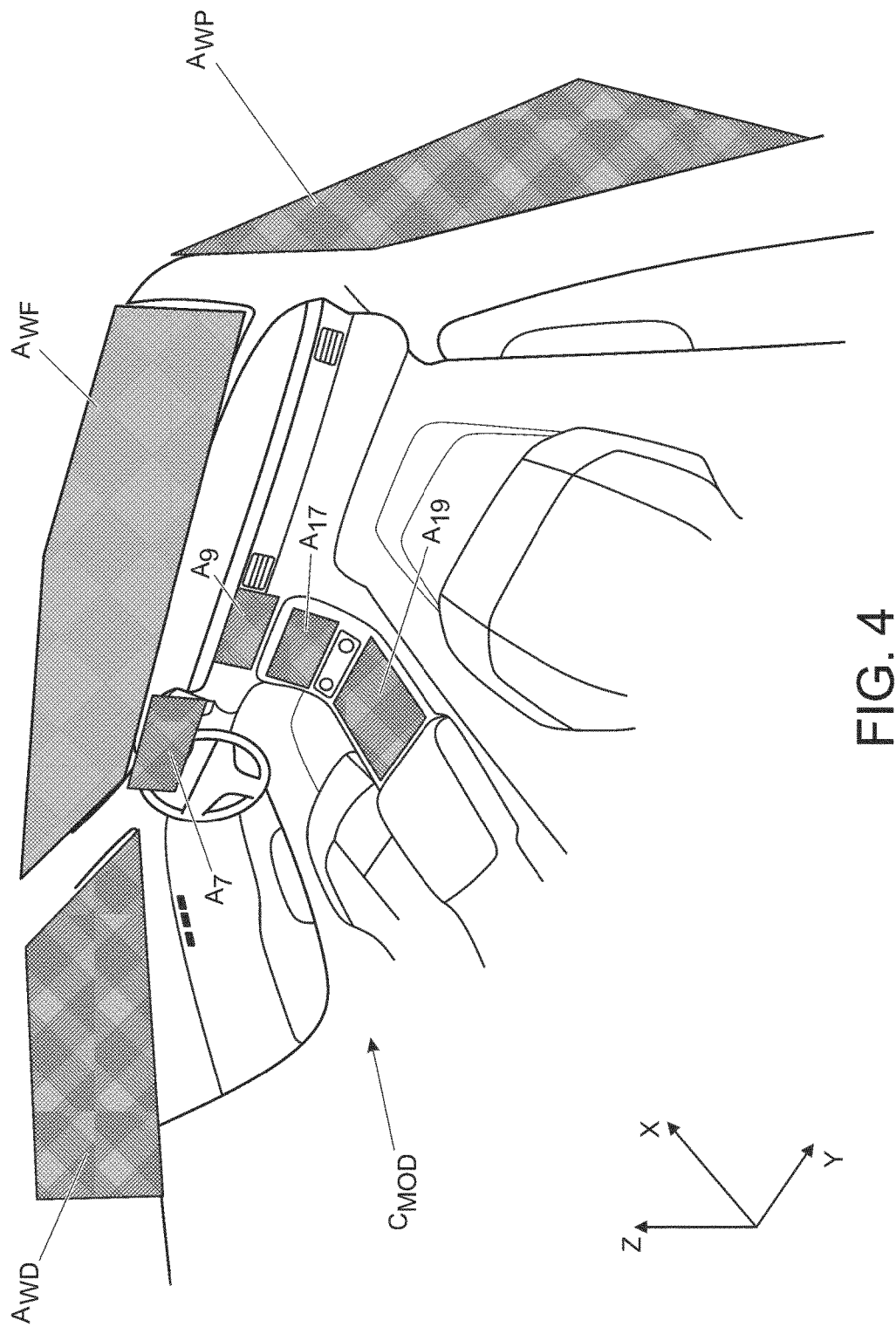
FIG. 4 illustrates a three-dimensional model of the vehicle cabin incorporating predefined areas of interest.
Figure 5:
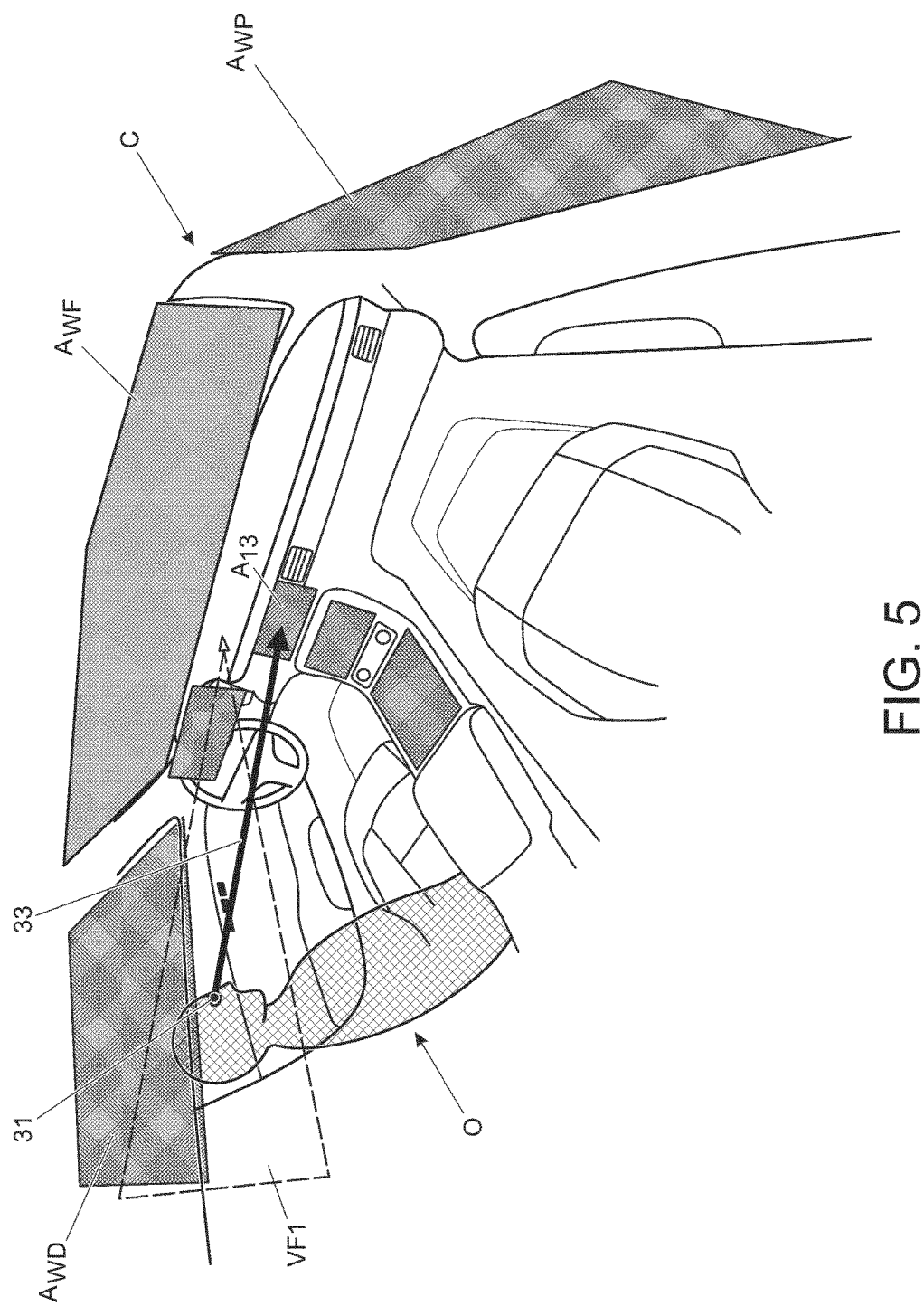
FIG. 5 illustrates the operation of the dynamic control apparatus according to an embodiment of the present invention based on the three-dimensional model shown in FIG. 5.

FIG. 4 is a schematic of the three-dimensional model $C_{MOD}$, which provides a virtual representation of the cabin C of FIG. 1. The virtual representation has been simplified for ease of explanation, however, it will be appreciated that the virtual representation will be understood to map onto the cabin C of FIG. 1 in dimension and shape so as to follow the contours of the cabin C. The three-dimensional model $C_{MOD}$ comprises a plurality of predefined areas of interest $A_n$ each associated with a different one of said visual zones relating to the cabin C. The cabin C is shown in phantom in FIG. 4 to highlight the relationship between the three-dimensional model $C_{MOD}$ and the cabin C of the vehicle V. Furthermore, the reference numbers of the associated feature of the cabin C are used herein as a subscript to identify the corresponding area of interest $A_n$ in the model $C_{MOD}$. In the present embodiment, the position and orientation of each area of interest $A_n$ is defined in three dimensions within the three-dimensional model $C_{MOD}$.

In operation, the processor 23 receives image data from the image sensors 3-1, 3-2 and performs image processing in order to determine the point of origin 31 and a virtual projection 33 for the vehicle driver. The point of origin 31 is shown in FIG. 5 as being on a driver side of the cabin C and the virtual projection 33 is shown to be pointing from the point of origin 31 towards the passenger side of the cabin C. The point of origin 31 is a point in three-dimensional coordinate space represented by a three-dimensional axes system (X-axis, Y-axis, Z-axis). Similarly, the virtual projection 33 is defined with respect to the three-dimensional axes and therefore will have an angular offset with respect to each axis. As shown in FIG. 5, the image sensors 3-1, 3-2 are used to determine the point of origin 31 and the virtual projection 33. This information is then combined with the three-dimensional model $C_{MOD}$ to determine which said area of interest $A_n$ is currently being looking at by the user.

In more detail, the point of origin is calculated by first using image data to identify a face of the vehicle driver, for example, using face detection algorithms or "face-tracking" as is well known in the art. Following the identification, an approximation can be made of the position and orientation of the vehicle driver's head. Image processing techniques are then used to identify eye position. Having determined the head position, orientation and eye position, the processor 23 can calculate the point of origin 31 in a three-dimensional space of the cabin C. The point of origin 31 can be chosen as a mid-point between the eyes of the vehicle driver. The point of origin 31 is calculated with respect to a vehicle cabin origin (not shown), which is a centre-point origin position in the cabin C. In particular, as there are two image sensors 3-1, 3-2 spaced by a known, predetermined distance, a triangulation calculation can be performed to determine the point of origin 31 with respect to the vehicle cabin origin. The use of the two image sensors 3-1, 3-2 allows a depth dimension to be determined in addition to other spatial dimensions. Fixed reference points for the image sensors 3-1, 3-2 can also be used to assist determining the point of origin 31. Thereafter, the image sensors 3-1, 3-2 are used to perform eye tracking to determine the virtual projection 33. For example, infra-red or near infra-red light can be directed towards the vehicle driver's eyes, which can reflect off the eyes to provide information about the direction in which the vehicle driver is looking. Image processing is then carried out so as to determine the virtual projection 33.

The processor 23 then calculates a virtual projection 33 representative of a gaze vector of the vehicle driver based on the point of origin 31 and the virtual projection 33. The virtual projection 33 is plotted in the three-dimensional model $C_{MOD}$ so that it initiates at the determined point of origin 31 and extends in the determined virtual projection 33. The processor 23 then determines if the virtual projection 33 intersects one of the plurality of areas of interest $A_n$ defined within the three-dimensional model $C_{MOD}$ corresponding to a window W. The intersected areas of interest $A_n$ correspond with a visual zone currently being viewed by the vehicle driver. In this example, the virtual projection is intersecting the area of interest $A_9$ associated with the infotainment system 9. The driver monitor 21 can thereby determine when the driver is looking at the road (eyes on-road) and not looking at the road (eyes off-road). The levels of driver attentiveness are derived based on the amount of time and/or frequency that the driver's eyes are on the road. If the driver monitor 21 determines that the cumulative time during which this eyes off-road scenario continues exceeds the predefined threshold, the level of attentiveness of the driver can be downgraded. The reclassification of the level of attentiveness of the driver is published to the CAN bus.

Figure 6:
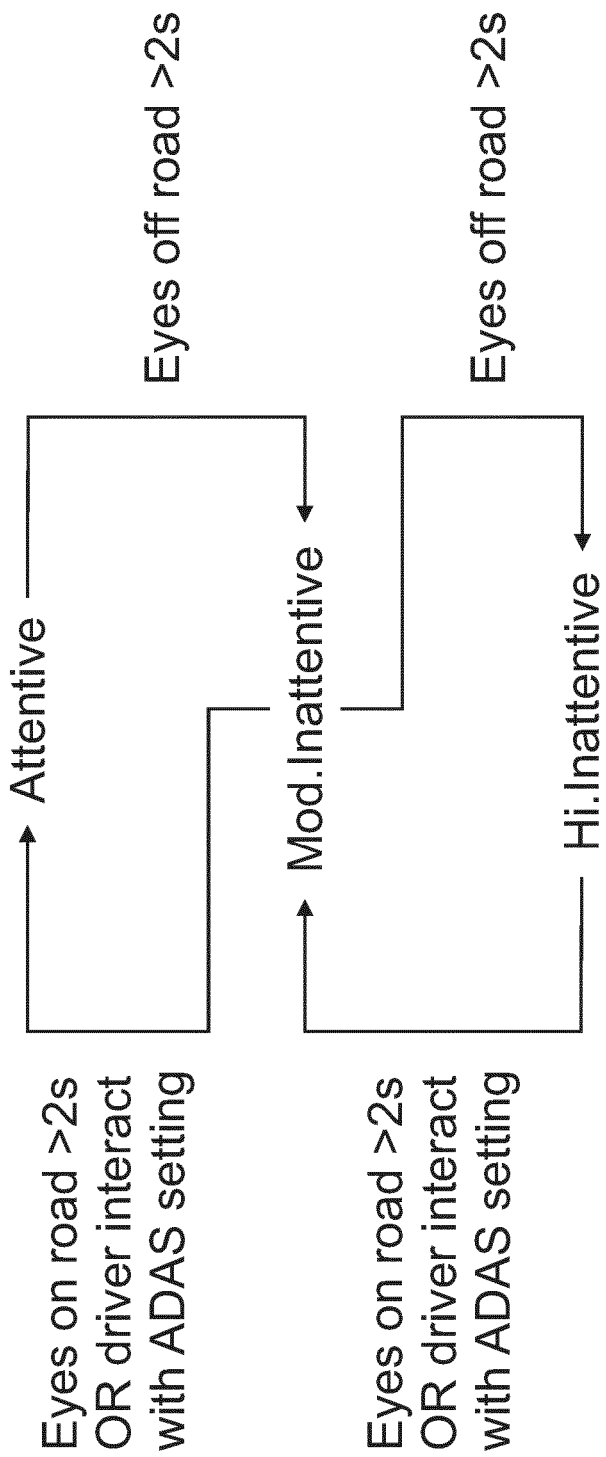
FIG. 6 represents the determined driver attentiveness according to an embodiment of the present invention.

In use, the dynamic control apparatus 1 can combine the monitored state of the level of driver attention to the road and based on the attentive state of the driver either adjust the sensitivity level or enable the ADAS feature(s). The implementation strategy is outlined below with reference to the flow chart shown in FIG. 6. A time threshold of 2 seconds is applied to determine an increase (+1) or decrease (−1) in the attentiveness level of the driver. If an eyes off-road event is detected having duration of greater than 2 seconds, the attentiveness level is decreased (−1). Conversely, if an eyes on-road event is detected having duration of greater than 2 seconds, the attentiveness level is increased (+1). It will be appreciated that the time threshold can be calibrated or can be varied depending on dynamic vehicle parameters, for example in dependence on the vehicle speed.

The vehicle system controller 29 modifies the sensitivity level of the vehicle driver aid systems in dependence on the level of attentiveness published to the CAN bus. For example, the vehicle system controller 29 can modify the sensitivity of one or more ADAS, as outlined herein. Thus, the dynamic control apparatus 1 can dynamically adjust the sensitivity setting of on-board vehicle driver aid systems in dependence on the determined level of attentiveness of the driver.

Figure 7:
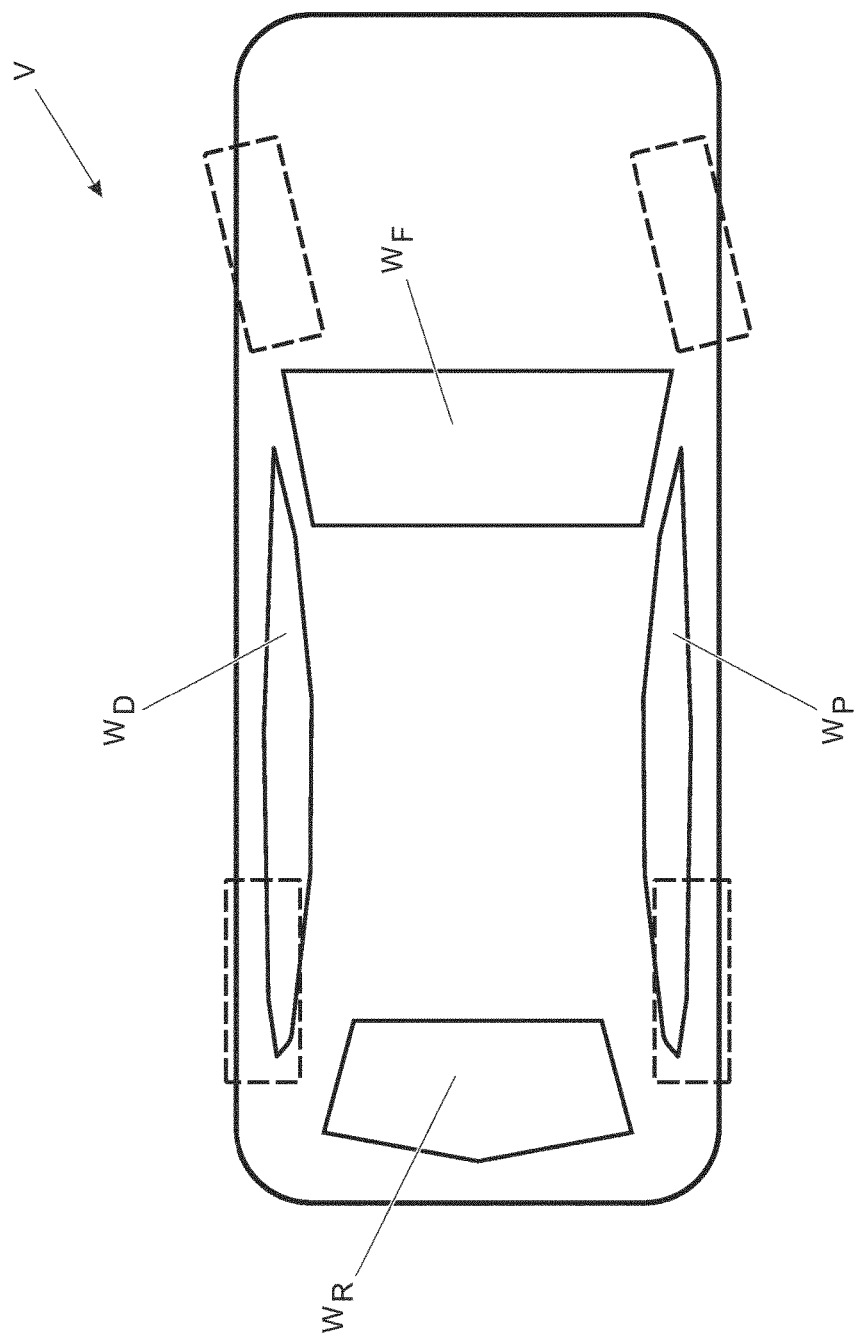
FIG. 7 is a schematic representation of a vehicle comprising the dynamic control apparatus according to an embodiment of the present invention.

The vehicle V comprising the dynamic control apparatus 1 is shown schematically in FIG. 7. The dynamic control apparatus 1 has been described with particular reference to the front windscreen $W_F$ and the corresponding road scene in front of the vehicle V. It will be appreciated that the apparatus 1 could also function with the side windows $W_D$, $W_P$ and optionally also the rear windscreen $W_R$. Further control strategies could determine when the driver O is looking in a rear view mirror (not shown) or in one of the side mirror of the vehicle (not shown).

It will be appreciated that various changes and modifications can be made to the dynamic control apparatus 1 described herein without departing from the scope of the invention defined herein. The dynamic control apparatus 1 has been described with reference to a three-dimensional model $C_{MOD}$ corresponding to the vehicle cabin. The model $C_{MOD}$ could be simplified, for example to define areas of interest with reference to a fixed origin.

The dynamic control apparatus 1 has been described as comprising two image sensors 3-1, 3-2. It will be appreciated that the apparatus 1 could utilise a single image sensor or a stereo image sensor. The attentiveness of the driver could be determined with reference to head pose or gaze direction.

Rather than determine the virtual projection of the driver O, the driver monitor could be arranged to determine a point of interest on a surface. The model $C_{MOD}$ can be configured to define surfaces which are used to identify when the point of interest corresponds to an eyes off-road event.

Further aspects of the present invention are set out in the following paragraphs:

1. A method of dynamically controlling one or more vehicle driver aid systems, the method comprising:
   using at least one image sensor to determine driver attentiveness; and
   controlling the sensitivity of one or more of said vehicle driver aid systems in dependence on the determined driver attentiveness.
2. A method as described in paragraph 1, wherein determining driver attentiveness comprises identifying an eyes off-road event and/or an eyes on-road event.
3. A method as described in paragraph 2, wherein determining driver attentiveness comprises measuring a cumulative time period and/or a frequency for said eyes off-road event and/or said eyes on-road event.
4. A method as described in paragraph 2 comprising determining that driver attentiveness has increased when an eyes on-road event is detected for a first predefined time period; and determining that driver attentiveness has decreased when an eyes off-road event is detected for a second predefined time period.
5. A method as described in paragraph 1 comprising plotting a virtual projection representative of a line of sight of the driver.
6. A method as described in paragraph 5 comprising integrating the virtual projection with a virtual model of at least a portion of said vehicle stored in memory to determine driver attentiveness.
7. A method as described in paragraph 6, wherein the virtual model comprises a plurality of predefined areas of interest and a relative weighting is applied to each said area of interest.

8. A method as described in paragraph 7, wherein driver attentiveness is determined in dependence on the weighting of the area of interest with which the line of sight of the driver is coincident.
9. A method as described in paragraph 1, wherein said one or more vehicle driver aid systems comprise one or more of the following: Adaptive Cruise Control (ACC); Forward Warning Collision (FWC); Lane Departure Warning (LDW); Traffic Jam Assist (TJA); and Lane Keeping Aid (LKA).
10. A dynamic control apparatus for controlling one or more vehicle driver aid systems, the apparatus comprising:
   at least one image sensor for monitoring a driver of a vehicle;
   one or more processors configured to analyse image data output from said at least one image sensor to determine driver attentiveness; and
   a controller configured to control the sensitivity of one or more of said vehicle driver aid systems in dependence on said determined driver attentiveness.
11. A dynamic control apparatus as described in paragraph 8, wherein the processor is configured to determine driver attentiveness by identifying an eyes off-road event and/or an eyes on-road event.
12. A dynamic control apparatus as described in paragraph 11, wherein the processor is configured to determine that driver attentiveness has increased when an eyes on-road event is detected for a first predefined time period; and to determine that driver attentiveness has decreased when an eyes off-road event is detected for a second predefined time period.
13. A dynamic control apparatus as described in paragraph 10, wherein the processor is configured to categorise driver attentiveness according to one or more predefined thresholds.
14. A dynamic control apparatus as described in paragraph 10, wherein the processor is configured to plot a virtual projection representative of a line of sight of the driver.
15. A dynamic control apparatus as described in paragraph 14, wherein the processor is configured to integrate the virtual projection with a virtual model of at least a portion of said vehicle stored in memory to determine driver attentiveness.
16. A dynamic control apparatus as described in paragraph 15, wherein the virtual model comprises a plurality of predefined areas of interest and a relative weighting is applied to each said area of interest.
17. A dynamic control apparatus as described in paragraph 16, wherein driver attentiveness is determined in dependence on the weighting of the area of interest with which the line of sight of the driver is coincident.
18. A dynamic control apparatus as described in paragraph 10, wherein said one or more vehicle driver aid systems comprise one or more of the following: Adaptive Cruise Control (ACC); Forward Warning Collision (FWC); Lane Departure Warning (LDW); Traffic Jam Assist (TJA); and Lane Keeping Aid (LKA).
19. A vehicle comprising a dynamic control apparatus as described in paragraph 10.

The invention claimed is:
1. A method of dynamically controlling one or more vehicle driver aid systems, the method comprising:
   using at least one image sensor to determine driver attentiveness; and
   controlling sensitivity of one or more of said vehicle driver aid systems in dependence on the determined driver attentiveness,
   wherein determining the driver attentiveness comprises plotting a virtual projection representative of a line of sight of the driver and integrating the virtual projection with a virtual model of at least a portion of the vehicle stored in memory, the virtual model comprising a plurality of predefined areas of interest and a relative weighting applied to each predefined area of interest.
2. The method as claimed in claim 1, wherein determining the driver attentiveness comprises identify an eyes off-road event and/or an eyes on-road event.
3. The method as claimed in claim 2, wherein determining the driver attentiveness comprises measuring a cumulative time period and/or a frequency for the eyes off-road event and/or the eyes on-road event.
4. The method as claimed in claim 1, further comprising:
   determining that driver attentiveness has increased when an eyes on-road event is detected for a first predefined time period; and
   determining that driver attentiveness has decreased when an eyes off-road event is detected for a second predefined time period.
5. The method as claimed in claim 1, wherein the driver attentiveness is determined in dependence on the relative weighting of one of the plurality of predefined areas of interest with which the line of sight of the driver is coincident.
6. The method as claimed in claim 5, wherein the weighting is modified in dependence on one or more current dynamic operating parameters of the vehicle.
7. The method as claimed in claim 1, wherein the one or more vehicle driver aid systems comprise one or more of the following: Adaptive Cruise Control (ACC); Forward Warning Collision (FWC); Lane Departure Warning (LDW); Traffic Jam Assist (TJA); and Lane Keeping Aid (LKA).
8. A computer program product, comprising a non-transitory computer readable storage medium having encoded thereon instructions that, when executed on a processor, cause the processor to perform the method of claim 1.
9. A dynamic control apparatus for controlling one or more vehicle driver aid systems, the apparatus comprising:
   at least one image sensor for monitoring a driver of a vehicle;
   at least one processor configured to analyze image data output from the at least one image sensor to determine driver attentiveness; and
   a controller configured to control sensitivity of one or more of the vehicle driver aid systems in dependence on the determined driver attentiveness;
   wherein the at least one processor is configured to plot a virtual projection representative of a line of sight of the driver and to integrate the virtual projection with a virtual model of at least a portion of the vehicle stored in memory to determine driver the attentiveness, the virtual model comprising a plurality of predefined areas of interest and a relative weighting applied to each predefined area of interest.
10. The dynamic control apparatus as claimed in claim 9, wherein the at least one processor is configured to determine the driver attentiveness by identifying an eyes off-road event and/or an eyes on-road event.
11. The dynamic control apparatus as claimed in claim 9, wherein the at least one processor is configured to determine that the driver attentiveness has increased when an eyes on-road event is detected for a first predefined time period and determine that the driver attentiveness has decreased when an eyes off-road event is detected for a second predefined time period.

12. The dynamic control apparatus as claimed in claim 9, wherein the at least one processor is configured to categorize the driver attentiveness according to one or more predefined thresholds.

13. The dynamic control apparatus as claimed in claim 9, wherein the driver attentiveness is determined in dependence on the relative weighting of one of the plurality of predefined areas of interest with which the line of sight of the driver is coincident.

14. The dynamic control apparatus as claimed in claim 9, wherein the one or more vehicle driver aid systems comprise one or more of the following: Adaptive Cruise Control (ACC); Forward Warning Collision (FWC); Lane Departure Warning (LDW); Traffic Jam Assist (TJA); and Lane Keeping Aid (LKA).

15. A vehicle comprising a dynamic control apparatus as claimed in claim 9.

16. A dynamic control apparatus for controlling one or more vehicle driver aid systems, the apparatus comprising:
- at least one image sensor configured to monitor a driver of a vehicle;
- at least one processor configured to analyze image data output from the at least one image sensor to determine driver attentiveness; and
- a controller configured to control the sensitivity of one or more of the vehicle driver aid systems in dependence on the determined driver attentiveness;
- wherein the at least one processor is configured to identify an eyes off-road event and/or an eyes on-road event and to measure a cumulative time period and/or a frequency for said eyes off-road event and/or said eyes on-road event.

17. A vehicle comprising the dynamic control apparatus as claimed in claim 16.

* * * * *